United States Patent [19]

Shelesky et al.

[11] Patent Number: 6,074,684
[45] Date of Patent: Jun. 13, 2000

[54] PROCESS OF MAKING NUT BRITTLE

[76] Inventors: Stefanie T. Shelesky, 3181 Stonehurst Dr., Fairfax, Va. 22031; Lori S. Anderson, 9258 Cardinal Forrest Ln., #302, Lorton, Va. 22079

[21] Appl. No.: 09/273,506

[22] Filed: Mar. 22, 1999

[51] Int. Cl.⁷ .................................. A23L 1/36; A23G 3/00
[52] U.S. Cl. .......................... 426/629; 426/632; 426/660; 426/517; 426/518
[58] Field of Search .............................. 426/93, 629, 632, 426/660, 517, 518

[56] References Cited

U.S. PATENT DOCUMENTS

| | | |
|---|---|---|
| 306,727 | 10/1884 | Edson . |
| 864,298 | 8/1907 | Green et al. . |
| 1,606,950 | 11/1926 | Long . |
| 2,019,365 | 10/1935 | Speed . |
| 2,556,111 | 6/1951 | Sargent . |
| 3,009,427 | 11/1961 | Bell . |
| 4,098,914 | 7/1978 | Knechtel . |
| 4,358,469 | 11/1982 | Lavie . |
| 5,079,027 | 1/1992 | Wong et al. . |
| 5,384,148 | 1/1995 | Lynch et al. . |

FOREIGN PATENT DOCUMENTS 152962  1/1951  Australia .

*Primary Examiner*—Milton Cano
*Attorney, Agent, or Firm*—Richard C. Litman

[57] ABSTRACT

A process of making nut brittle such as peanut brittle is disclosed. The process includes a step of combining sugar, corn syrup, and water to form a first mixture. The first mixture is heated to a first syrup temperature of about 275° F. Butter is added to the first mixture to form a second mixture. The second mixture is heated to a second syrup temperature between 285 and 300° F. The second syrup temperature is indicated by a color change from an off-white color to a straw color. A soda mixture of baking soda, water, and vanilla is added to the second mixture with nuts and nut butter, forming a final mixture. Preferably the nuts are Virginia peanuts and the nut butter is peanut butter. The final mixture is sheeted to form a ribbon. The ribbon is cooled rapidly to a temperature between 35 and 550° F., then allowed to rewarm to room temperature and broken in pieces. The nut brittle has a delicious nutty flavor. The texture is softer and easier on the teeth than conventional nut brittles.

20 Claims, No Drawings

PROCESS OF MAKING NUT BRITTLE

BACKGROUND OF THE INVENTION

1. Field of the Invention

The present invention relates to peanut candy, and more particularly, to a process of making peanut candy.

2. Description of the Related Art

Peanut candy compositions and processes for making peanut candy are well known in the art.

U.S. Pat. No. 306,727 issued on Oct. 21, 1884 to Edson, discloses a process of roasting peanuts and a composition of peanut paste compounded with sugar for use in candy. The peanuts are ground between heated surfaces. The paste may be heated to about 100° F. to a liquid state for mixing with flour or fluids. The composition includes one part peanut paste to 7 parts sugar.

U.S. Pat. No. 864,298 issued on Aug. 27, 1907 to Green et al., discloses a process of making soft peanut candy using specific proportions of white sugar, yellow sugar, water, glucose, and peanuts. The mixture is cooked to a temperature of between 275 and 295° F., and cooled rapidly by adding additional water.

U.S. Pat. No. 1,606,950 issued on Nov. 16, 1926 to Long, discloses a peanut brittle which is made soft by numerous air holes. The brittle is made by heating sugar, corn syrup, and water to 232° F. Peanuts are added and the mixture heated to 284° F. Salt and pulverized nut brittle from a previous batch are stirred in, baking soda added, and the brittle is cooled on a cooling slab.

U.S. Pat. No. 3,009,427 issued on Nov. 21, 1961 to Bell discloses a commercial process for manufacturing peanut brittle. The peanut brittle includes peanuts, sugar, corn syrup, and baking soda. The mixture is heated to about 300–315° F., rolled and stretched, and cooled to about 60° F.

U.S. Pat. No. 4,098,914 issued on Jul. 4, 1978 to Knechtel discloses a process for manufacturing peanut brittle and other nut brittles, and is incorporated herein by reference. Sugar, corn syrup, water, salt, and peanuts are mixed and cooked to 275° F., butter is added, and the mixture cooked to 300° F. A mix of chopped popped popcorn, bicarbonate of soda, vanilla, and powdered sugar is added, and the mixture is sheeted. Peanut content is about 32% or more. Preferably the entire sequence is automated; the mixing occurs in a continuous feeder, and the mixture is sheeted and stretched on a series of polyurethane conveyors. The cooling is done by a refrigerated chamber which cools one or more conveyor belts and may be supplemented by refrigerated air blown on the ribbon. When the final ribbon reaches room temperature, it is broken by contact with spikes projecting from a rotating drum.

None of the above inventions and patents, taken either singularly or in combination, is seen to describe the instant invention as claimed. Thus a process of making nut brittle solving the aforementioned problems is desired.

SUMMARY OF THE INVENTION

The present invention is a process of making nut brittle. The process includes a step of combining sugar, corn syrup, and water to form a first mixture. The first mixture is heated to a first syrup temperature of about 275° F. Butter is added to the first mixture to form a second mixture. The second mixture is heated to a second syrup temperature between 285 and 300° F. The second syrup temperature is indicated by a color change from an off-white color to a straw color. A soda mixture of baking soda, water, and vanilla is added to the second mixture with nuts and nut butter, forming a final mixture. Preferably the nuts are Virginia peanuts and the nut butter is peanut butter. The final mixture is sheeted to form a ribbon. The ribbon is cooled rapidly to a temperature between 35 and 55° F., then allowed to rewarm to room temperature and broken in pieces. The nut brittle has a delicious nutty flavor. The texture is softer and easier on the teeth than conventional nut brittles.

Accordingly, it is a principal object of the invention to provide a process of making nut brittle which has a nutty flavor and is softer and easier to chew than conventional nut brittles.

It is another object of the invention to provide a process of making peanut brittle which takes full advantage of the flavor of Virginia peanuts.

It is an object of the invention to provide improved steps and arrangements thereof for the purposes described which is inexpensive, dependable and fully effective in accomplishing its intended purposes.

These and other objects of the present invention will become readily apparent upon further review of the following specification.

DETAILED DESCRIPTION OF THE PREFERRED EMBODIMENTS

The present invention is a process of making nut brittle. The process includes a step of combining sugar, corn syrup, and a first amount of water to form a first mixture. The sugar is preferably granulated white sugar; however, some powdered sugar or other forms of sugar may be used. The corn syrup is preferably a light corn syrup. Preferred amounts are 6 parts or about 6 parts each of sugar and light corn syrup, to 1 part or about 1 part water by volume. The ratio of sugar to corn syrup is approximately 1:1 by volume.

A further step of the process is heating the first mixture to a first syrup temperature. The mixture is stirred or mixed continuously or nearly continuously during the cooking to keep the temperature uniform. The first syrup temperature ranges from about 270 degrees F. to about 280 degrees F., preferably 273 degrees F. to about 277 degrees F. Most preferably, the first syrup temperature is about 275 degrees F. The heating may be done in a heated mixer, in a steam-heated continuous feeder, or by other suitable means.

A further step of the process is combining butter with the first mixture to form a second mixture. The butter is optimally unsalted dairy butter. The preferred amount is 0.5 parts or about 0.5 parts butter, to 6 parts corn syrup.

The second mixture is heated with stirring to a second syrup temperature. The second syrup temperature is greater than 285° F. and less than 300° F. Preferably the second syrup temperature ranges from 288 to 297° F., most preferably about 290° F. to about 295° F. The heating generally requires only about one minute.

The first mixture is generally clear with a slight yellowish color. After the addition of the butter the second mixture is a creamy opaque off-white color. The correct second syrup temperature is indicated by a color change from the off-white color to a straw color. The color change occurs quickly, over a few seconds' time. If the second syrup temperature is too high, an undesirably hard peanut brittle is produced.

Another step of the process is warming a nut butter to a semiliquid consistency. Warming the nut butter may be done before combining the ingredients to form the first mixture, or simultaneously with preparing the first and/or second mixtures. It is important, however, that the nut butter be warmed and ready to add before the second mixture reaches the second syrup temperature. The nut butter may be warmed by means of microwave energy, as in a microwave oven.

The nut butter is preferably peanut butter, but part or all may be almond butter or other nut butters. For peanut butter, the preferred nut butter temperature ranges from about 85 degrees F. to about 95 degrees F. The temperature should be high enough so that the nut butter is softened and its viscosity is reduced. This allows nut butters such as peanut butter to be stirred quickly and uniformly into the second mixture. The flavor is also enhanced. The nut butter temperature should be low enough so that the nut butter is not completely liquid. overly liquid peanut butter, for example, tends to separate and produce an unpleasant greasy film in the finished product. For most peanut butters, the proper consistency is obtained with a temperature somewhat below 100° F.

Any commercially available brand of peanut butter is suitable. A high-quality peanut butter improves the flavor of the final product. The preferred amount is about 8 parts peanut butter to 6 parts corn syrup by volume.

After the second syrup temperature is reached, bicarbonate of soda, a second amount of water, vanilla, nuts, and the warmed nut butter are added to the second mixture. This forms a final mixture. Ideally, the bicarbonate of soda, the water, and the vanilla are mixed to form a soda mixture, and the soda mixture is combined with the second mixture. The soda mixture is preferably added first, before the peanuts and the peanut butter. The peanut butter is preferably added after the peanuts. This order allows for more thorough mixing with better dispersion of the ingredients, as well as better flavor. The preferred embodiment contains about 0.1 parts bicarbonate of soda, about 0.2 parts of a second amount of water, and about 0.1 parts vanilla to 6 parts corn syrup or 8 parts peanut butter by volume.

Any type of nut may be used, including almonds, cashews, and sunflower seeds. Preferably the nuts are unsalted peanuts. Optimally the peanuts are Virginia peanuts. Virginia peanuts are a gourmet variety which is some 30% larger than ordinary peanuts. Virginia peanuts have a particularly delicious flavor. Virginia peanuts are commercially available from THE PEANUT SHOP, as well as many other sources.

Ideally the peanuts are half peanuts, as opposed to whole nuts. Peanut chunks may also be used as part or all of the nuts. For nuts other than peanuts, the largest pieces are preferably no larger than a peanut half.

If a nut other than peanuts is used, the nut butter may be the butter of the corresponding nut, or may be peanut butter. For example, almonds may be combined with almond butter or with peanut butter.

The preferred amount of peanuts is 8 parts peanuts to 6 parts corn syrup. The preferred ratio of peanuts to peanut butter is approximately 1:1 by volume. This is a ratio of peanut butter to corn syrup of approximately 4:3 by volume.

The next step of the process is sheeting the final mixture to form a ribbon. The sheeting may be done manually or in a commercial sheeter. A suitable thickness is ¼ to ½ inches.

The ribbon is cooled rapidly to a temperature between 35 and 55 degrees F., preferably about 38 degrees F. to about 52 degrees F. Ideally the step of rapidly cooling the ribbon is carried out in a freezer chamber. If cooling is too slow, an undesirably hard peanut brittle will be produced. The freezer chamber may have a freezer temperature ranging from about 0 degrees F. to about 32 degrees F. The ribbon equilibrates in the freezer chamber for a freezer time, which is preferably less than 20 minutes. A refrigerated conveyor is also suitable.

The next step of the process is removing the ribbon from the freezer chamber and allowing it to rewarm to room temperature. The ribbon should not remain too long in the freezer chamber. Actual freezing of the ribbon causes undesirable changes in the appearance and texture of the nut brittle.

The final step of the process is breaking the ribbon into pieces and packaging the pieces for sale and/or shipment. This may be done by any conventional means.

EXAMPLE

Nut brittle was prepared by initially heating 2 cups of peanut butter (Jif brand) in a microwave oven on its highest setting for 1 minute and 15 seconds. The first mixture was made by mixing together 1½ cups granulated white sugar, 1½ cups light corn syrup (KARO brand), and ¼ cup water. The first mixture was cooked over high heat to 275° F., measured with a conventional candy thermometer. 2 tablespoons of unsalted butter were added to form the second mixture. The cooking was continued to the color change at about 290–295° F. The second mixture was removed from the heat. A soda mixture was quickly added; the soda mixture was made shortly before by dissolving 1 teaspoon of baking soda in 2 teaspoons of water and adding 1 teaspoon of vanilla. The soda mixture was quickly followed by 2 cups of Virginia peanuts and the warmed peanut butter. The resulting final mixture was then spread into a ribbon on ungreased cookie sheets. The sheets were placed in a freezer for 15 minutes, then removed. A knife was used to separate the ribbon from the cookie sheets and break it into pieces.

The peanut brittle produced by the process is delicious and irresistible. The use of peanut butter and Virginia peanuts, in particular, gives an enhanced nutty flavor, taking full advantage of the flavor of the Virginia peanuts. The texture is hard enough for the brittle to be broken into pieces. However, the texture is softer than conventional peanut brittles and easier to chew, with less tendency to stick to the teeth.

It is to be understood that the present invention is not limited to the embodiments described above, but encompasses any and all embodiments within the scope of the following claims.

We claim:

1. A process of making nut brittle, comprising the steps of:
    combining sugar, corn syrup, and a first amount of water to form a first mixture;
    heating the first mixture to a first syrup temperature, the first syrup temperature ranging from about 270 degrees F. to about 280 degrees F.;
    combining butter with the first mixture to form a second mixture;
    heating the second mixture to a second syrup temperature, the second syrup temperature being greater than 285 degrees F. and less than 300 degrees F.;
    warming nut butter to a semiliquid consistency;
    combining bicarbonate of soda, a second amount of water, vanilla, nuts, and the nut butter with the second mixture to form a final mixture;
    sheeting the final mixture to form a ribbon;
    cooling the ribbon rapidly to a temperature between 35 and 55 degrees F.;

rewarming the ribbon to room temperature; and breaking the ribbon into pieces.

2. The process according to claim 1, wherein the nuts are peanuts, and the nut butter is peanut butter.

3. The process according to claim 2, wherein the peanuts are Virginia peanuts.

4. The process according to claim 2, wherein the ratio of peanuts to peanut butter is approximately 1:1.

5. The process according to claim 2, wherein the ratio of sugar to corn syrup is approximately 1:1.

6. The process according to claim 5, wherein the ratio of peanuts to peanut butter is approximately 1:1, and the ratio of peanut butter to corn syrup is approximately 4:3.

7. The process according to claim 2, wherein the corn syrup is light corn syrup.

8. The process according to claim 2, wherein the step of warming the peanut butter includes warming the peanut butter by means of microwave energy.

9. The process according to claim 2, wherein the peanuts are half peanuts.

10. The process according to claim 2, wherein the first syrup temperature is about 275 degrees F.

11. The process according to claim 2, wherein the second syrup temperature is indicated by a color change from an off-white color to a straw color.

12. The process according to claim 2, wherein the second syrup temperature ranges from about 290 degrees F. to about 295 degrees F.

13. The process according to claim 2, wherein the peanut butter is warmed to a nut butter temperature ranging from about 85 degrees F. to about 95 degrees F.

14. The process according to claim 2, wherein the step of rapidly cooling the ribbon is carried out in a freezer chamber, and the freezer chamber has a freezer temperature ranging from about 0 degrees F. to about 32 degrees F.

15. The process according to claim 14, wherein the ribbon equilibrates in the freezer chamber for a freezer time, and the freezer time is less than 20 minutes.

16. The process according to claim 2, wherein the bicarbonate of soda, the second amount of water, and the vanilla are combined to form a soda mixture, and the soda mixture is combined with the second mixture.

17. The process according to claim 16, wherein the soda mixture is combined with the second mixture prior to combining the peanuts and the peanut butter with the second mixture.

18. The process according to claim 17, wherein the peanuts are combined with the second mixture prior to combining the peanut butter with the second mixture.

19. A process of making nut brittle, comprising the steps of:

combining about 6 parts sugar, about 6 parts light corn syrup, and about 1 part of a first amount of water to form a first mixture;

heating the first mixture to a first syrup temperature, the first syrup temperature ranging from about 270 to about 280 degrees F.;

combining about 0.5 parts butter with the first mixture to form a second mixture;

heating the second mixture to a second syrup temperature, the second syrup temperature being greater than 285 degrees F. and less than 300 degrees F.;

warming about 8 parts peanut butter to a semiliquid consistency;

combining bicarbonate of soda, a second amount of water, vanilla, about 8 parts peanuts, and the peanut butter with the second mixture to form a final mixture;

sheeting the final mixture to form a ribbon;

cooling the ribbon rapidly to a temperature between 35 and 55 degrees F.;

rewarming the ribbon to room temperature; and breaking the ribbon into pieces.

20. A process of making nut brittle, comprising the steps of:

combining 6 parts sugar, 6 parts light corn syrup, and 1 part of a first amount of water to form a first mixture;

heating the first mixture to a first syrup temperature, the first syrup temperature ranging from about 273 degrees F. to about 277 degrees F.;

combining 0.5 parts butter with the first mixture to form a second mixture;

heating the second mixture to a second syrup temperature, the second syrup temperature ranging from about 288 degrees F. to about 297 degrees F.;

warming 8 parts peanut butter to a semiliquid consistency;

combining about 0.1 parts bicarbonate of soda, about 0.2 parts of a second amount of water, about 0.1 parts vanilla, about 8 parts Virginia peanuts, and the peanut butter with the second mixture to form a final mixture;

sheeting the final mixture to form a ribbon;

cooling the ribbon rapidly to a temperature between about 38 degrees F. and about 52 degrees F.;

rewarming the ribbon to room temperature; and breaking the ribbon into pieces.

* * * * *